US005644641A

United States Patent [19]

Ikeda

[11] Patent Number: 5,644,641

[45] Date of Patent: Jul. 1, 1997

[54] NOISE CANCELLING DEVICE CAPABLE OF ACHIEVING A REDUCED CONVERGENCE TIME AND A REDUCED RESIDUAL ERROR AFTER CONVERGENCE

[75] Inventor: Shigeji Ikeda, Tokyo, Japan

[73] Assignee: NEC Corporation, Tokyo, Japan

[21] Appl. No.: 610,255

[22] Filed: Mar. 4, 1996

[30] Foreign Application Priority Data

Mar. 3, 1995 [JP] Japan .................................. 7-044222

[51] Int. Cl.$^6$ .................................................. H04B 15/00

[52] U.S. Cl. .......................... 381/94.1; 381/93; 395/2.35

[58] Field of Search ................................ 395/2.35, 2.36, 395/2.37; 381/94, 71, 83, 93; 379/388, 389, 390, 410, 411, 412

[56] References Cited

U.S. PATENT DOCUMENTS

| | | | |
|---|---|---|---|
| 4,658,426 | 4/1987 | Chabries et al. | 381/94 |
| 4,726,037 | 2/1988 | Jayant | 395/2.37 |
| 5,259,033 | 11/1993 | Goodings et al. | 381/71 |
| 5,353,348 | 10/1994 | Sendyk et al. | 379/388 |
| 5,402,496 | 3/1995 | Soli et al. | 381/94 |
| 5,432,859 | 7/1995 | Yang et al. | 381/94 |

OTHER PUBLICATIONS

Widrow et al, "Adaptive Noise Cancelling: Principles and Applications", Proceedings of the IEEE, vol. 63, No. 12, Dec. 1975, pp. 1692–1716.

Nagumo, et al, "A Learning Method for System Identification", IEEE Transactions on Automatic Control, vol. AG–12, No. 3, Jun., 1967, pp. 282–287.

*Primary Examiner*—Curtis Kuntz
*Assistant Examiner*—Vivian Chang
*Attorney, Agent, or Firm*—Foley & Lardner

[57] ABSTRACT

In a noise cancelling device including a first subtractor (5) for producing a first difference signal as a noise cancelled signal by subtracting a first pseudo signal from an input signal having a main signal and a first noise signal superposed on the main signal and a first adaptive filter (4) for processing a second noise signal correlated with the first noise signal into the first pseudo signal in accordance with filter coefficients thereof, a second subtractor (7) subtracts a second pseudo signal from the first pseudo signal to produce a second difference signal. A second adaptive filter (6) processes the second noise signal into the second pseudo signal in accordance with filter coefficients thereof. First and second power averaging circuits (8 and 9) produce first and second averages (P1 and P2) of power of the second difference signal and the first pseudo signal, respectively. A step size calculating circuit (10) calculates, from the first and the second averages, a step size for use in renewal of the filter coefficients of each adaptive filter in deciding a rate of convergence of each adaptive filter at a time. The first adaptive filter renews the filter coefficients thereof into renewed filter coefficients in accordance with the second noise signal, the first difference signal, and the step size. The second adaptive filter renews the filter coefficients thereof into renewed filter coefficients in accordance with the second noise signal, the second difference signal, and the step size.

4 Claims, 3 Drawing Sheets

NOISE CANCELLING DEVICE CAPABLE OF ACHIEVING A REDUCED CONVERGENCE TIME AND A REDUCED RESIDUAL ERROR AFTER CONVERGENCE

BACKGROUND OF THE INVENTION

This invention relates to a noise cancelling device by the use of an adaptive filter.

A noise cancelling device of the type described, is supplied with an input signal having a main signal of for example, a speech signal and a noise signal acoustically superposed on the main signal. The noise cancelling device is for cancelling the noise signal from the input signal.

A background noise component which is superposed on the speech signal supplied through a microphone or a handset results in a serious problem in a speech processing device such as a narrow-band speech encoding unit of a high information compression type or a speech recognition unit. As a noise cancelling device for cancelling the noise component acoustically superposed, proposal is made of a two-input noise cancelling device using an adaptive filter in, for example, an article which is contributed by B. Widrow et al to Proceedings of IEEE, vol. 63, No. 12, December, 1975, pages 1692–1716 (hereinafter "Reference 1").

As will later be described, such a conventional noise cancelling device is incapable of achieving a reduced convergence time and a reduced final residual error after convergence.

SUMMARY OF THE INVENTION

It is therefore an object of this invention to provide a noise cancelling device which is capable of achieving a reduced convergence time and a reduced final residual error after convergence.

Other objects of this invention will become clear as the description proceeds.

A noise cancelling device to which this invention is applicable includes: a first input terminal for receiving an input signal comprising a main signal and a first noise signal superposed on the main signal; a second input terminal for receiving a second noise signal which is not correlated with the main signal but is correlated with the first noise signal; an output terminal; a first subtractor for subtracting a first pseudo signal from the input signal to produce a first subtraction result signal which is delivered to the output terminal; and a first adaptive filter having a plurality of filter coefficients for filtering, in accordance with the filter coefficients of the first adaptive filter, the second noise signal into a first filtered signal which is for use as the first pseudo signal.

According to this invention the noise cancelling device comprises: a second subtractor for subtracting a second pseudo signal from the first pseudo signal to produce a second subtraction result signal; a second adaptive filter having a plurality of filter coefficients for filtering, in accordance with the filter coefficients of the second adaptive filter, the second noise signal into a second filtered signal which is for use as the second pseudo signal; a first power averaging circuit for producing a first power average signal representative of a first average (P1) of power of the second subtraction result signal; a second power averaging circuit for producing a second power average signal representative of a second average (P2) of power of the first pseudo signal; and a step size calculating circuit for calculating, from the first and the second power average signals, a step size which is for use in renewal of the filter coefficients of each of the first and the second adaptive filters in deciding a rate of convergence of each of the first and the second adaptive filters at a time. The step size calculating circuit produces a step size signal representative of the step size. The first adaptive filter renews the filter coefficients of the first adaptive filter into renewed filter coefficients of the first adaptive filter in accordance with the second noise signal and the first subtraction result signal supplied as a first error signal and in accordance with the step size signal. The second adaptive filter renews the filter coefficients of the second adaptive filter into renewed filter coefficients of the second adaptive filter in accordance with the second noise signal and the second subtraction result signal supplied as a second error signal and in accordance with the step size signal.

In the noise cancelling device according to this invention, the second adaptive filter is supplied with the signal same as the input signal of the first adaptive filter for producing the first pseudo signal and is operated so as to cancel the first pseudo signal. Judgement is made of a convergence condition of the first and the second adaptive filters with reference to the second average (P2) of power of the first pseudo signal and the first average (P1) of power of the second error signal (that is, the second subtraction result signal) of the second adaptive filter. Based on the judgement, control is made of the step size for renewal of the filter coefficients of the first and the second adaptive filters. Thus, it is possible to realize a reduced convergence time and a reduced final residual error of the first subtraction result signal delivered to the output terminal as a noise-cancelled signal after convergence.

DESCRIPTION OF THE PREFERRED EMBODIMENT

Figure 1:
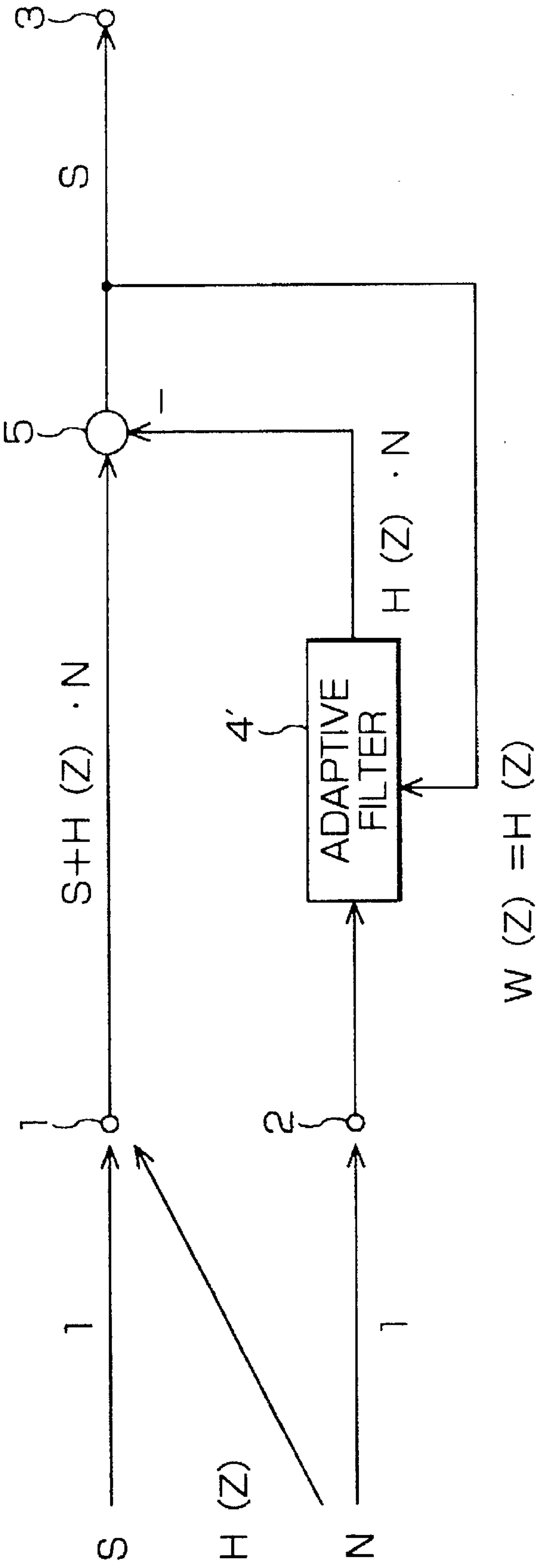
FIG. 1 PRIOR ART
FIG. 1 is a block diagram of a conventional noise cancelling device according to an embodiment of this invention.

Referring to FIG. 1, a conventional noise cancelling device will be described for a better understanding of this invention. The noise cancelling device is equivalent to the noise cancelling device described in the preamble of the instant specification.

The noise cancelling device illustrated in FIG. 1 includes a first input terminal 1 for receiving an input signal which comprises a speech signal (that is, a main signal) and a first noise signal superposed on the speech signal. A second input terminal 2 is for receiving a second noise signal which is not correlated with the speech signal but is correlated with the first noise signal in the manner which will become clear as the description proceeds. A first subtractor 5 subtracts a first pseudo signal from the first input signal to produce a first subtraction result signal which is delivered to an output terminal 3 as a noise cancelled signal.

A first adaptive filter 4' has a plurality of filter coefficients and filters, in accordance with the filter coefficients of the first adaptive filter 4', the second noise signal into a first filtered signal which is for use as the first pseudo signal. The first adaptive filter 4' renews or updates the filter coefficients of the first adaptive filter 4' into renewed filter coefficients of the first adaptive filter 4' in accordance with the second noise signal and the first subtraction result signal supplied as a first error signal in the manner which will presently be described.

The speech signal (or the main signal) at a sound source and a noise signal at a noise source are represented by S and N, respectively. It is assumed here that a transfer function from the sound source to the input terminal 1 is equal to "1" and another transfer function from the noise source to the input terminal 2 is equal to "1". A relative transfer function from the noise source to the input terminal 1 is represented by H(z).

The first adaptive filter 4' is supplied with the noise signal N as the second noise signal and carries out filter multiplication and sum calculation to produce a filter calculation result which is the first pseudo signal (or a pseudo-noise signal) W(z)·N, where W(z) is a transfer function of the first adaptive filter 4'. The first subtractor 5 subtracts the pseudo-noise signal w(z)·N from the input signal (S+H(z)·N) which has the speech signal with the noise signal superposed on the speech signal and which is supplied to the input terminal 1. The first subtractor 5 thereby produces a first difference signal. The first difference signal is delivered to the output terminal 3 as an output signal of the noise cancelling device on one hand and is supplied to the first adaptive filter 4' as the first error signal for renewal of the filter coefficients on the other hand.

In response to the first error signal thus supplied, the first adaptive filter 4' renews the filter coefficients by the use of a coefficient modification algorithm. As such an algorithm of the first adaptive filter 4', use is made of an LMS (least mean square) algorithm which is described in the above-mentioned "Reference 1". Alternatively, use may be made of a learning identification method (LIM) which is disclosed in an article which is contributed by J. Nagumo et al to IEEE Transactions on Automatic Control, Vol. AC-12, No. 3, 1967, pages 282–287 (will thereinafter "Reference 2").

Now, a coefficient renewing method will be described assuming that the LMS algorithm in "Reference 1" is used as a coefficient renewal algorithm of the adaptive filter 4'. Let an input signal supplied to the adaptive filter 4' be represented by x(k), the pseudo signal produced by the adaptive filter 4', z(k), a desired signal to be produced by the adaptive filter 4', y(k), and the error signal, e(K) (k being an index indicating a time). A j-th filter coefficient at the time instant k is represented by wj(k). In this event, the pseudo signal z(k) produced by the adaptive filter 4' is given by:

$$z(k) = \sum_{j=0}^{P-1} wj(k) \cdot x(k-j), \tag{1}$$

where P represents a total number of taps of the adaptive filter 4'. The error signal e(k) is given by:

$$e(k)=y(k)-z(k) \tag{2}$$

A modified coefficient is given by:

$$wj(k+1)=wj(k)+\mu \cdot e(k) \cdot x(k-j) \tag{3}$$

In Equation (3), μ represents a constant and is called a step size in the art. The step size μ is a parameter which controls stability and a rate of convergence as described in the above-mentioned "Reference 1". In other words, the step size μ determines a convergence time of the adaptive filter 4' and a residual error of the noise cancelled signal after convergence. If μ has a large value, each of the filter coefficients is modified by an increased amount so that a convergence speed or rate is high. However, variation of the noise cancelled signal in the vicinity of an optimum value is wide in correspondence to the increased amount of modification. This results in an increase of a final residual error. On the contrary, when μ has a small value, the final residual error is reduced although the convergence time increases. It will be understood that, in selection of the step size μ, a trade-off exists between the "convergence time" and the "final residual error".

In the conventional noise cancelling device described above, the error signal used in renewal of the filter coefficients of the adaptive-filter 4' is the noise-cancelled signal obtained by subtracting the pseudo signal (W(Z)·N) from the input signal (S+H(z)·N) having the speech signal and the noise signal superposed on the main signal. Supposing here that E represents the error signal, the error signal E is given by:

$$E=S+H(z)\cdot N-W(z)\cdot N. \tag{4}$$

When convergence of the adaptive filter 4' is almost completed, W(z) becomes substantially equal to H(z). In this event, the error signal E is given by:

$$E \approx S. \tag{5}$$

Equation (5) represents that the error signal for the renewal of the filter coefficients of the adaptive filter 4' it rendered equivalent to the speech signal. As a result, an output signal of the noise cancelling device includes a distortion correlated with the speech signal S. In particular, when the total number of the taps of the adaptive filter 4' is great, influence of the error signal appears in correspondence to time delay within the adaptive filter 4'. In this situation, a speech sound is difficult to be recognized because the speech sound is sensed with an echo contained therein.

In order to suppress such a phenomenon, it is required in the conventional noise cancelling device to select an extremely small value as the step size μ for renewal of the filter coefficients. However, when the step size μ is small, the convergence speed of the adaptive filter 4' inevitably becomes slow as described in the foregoing.

This invention achieves a reduced convergence time and a suppressed distortion after convergence in the manner which will presently be described.

Figure 2:
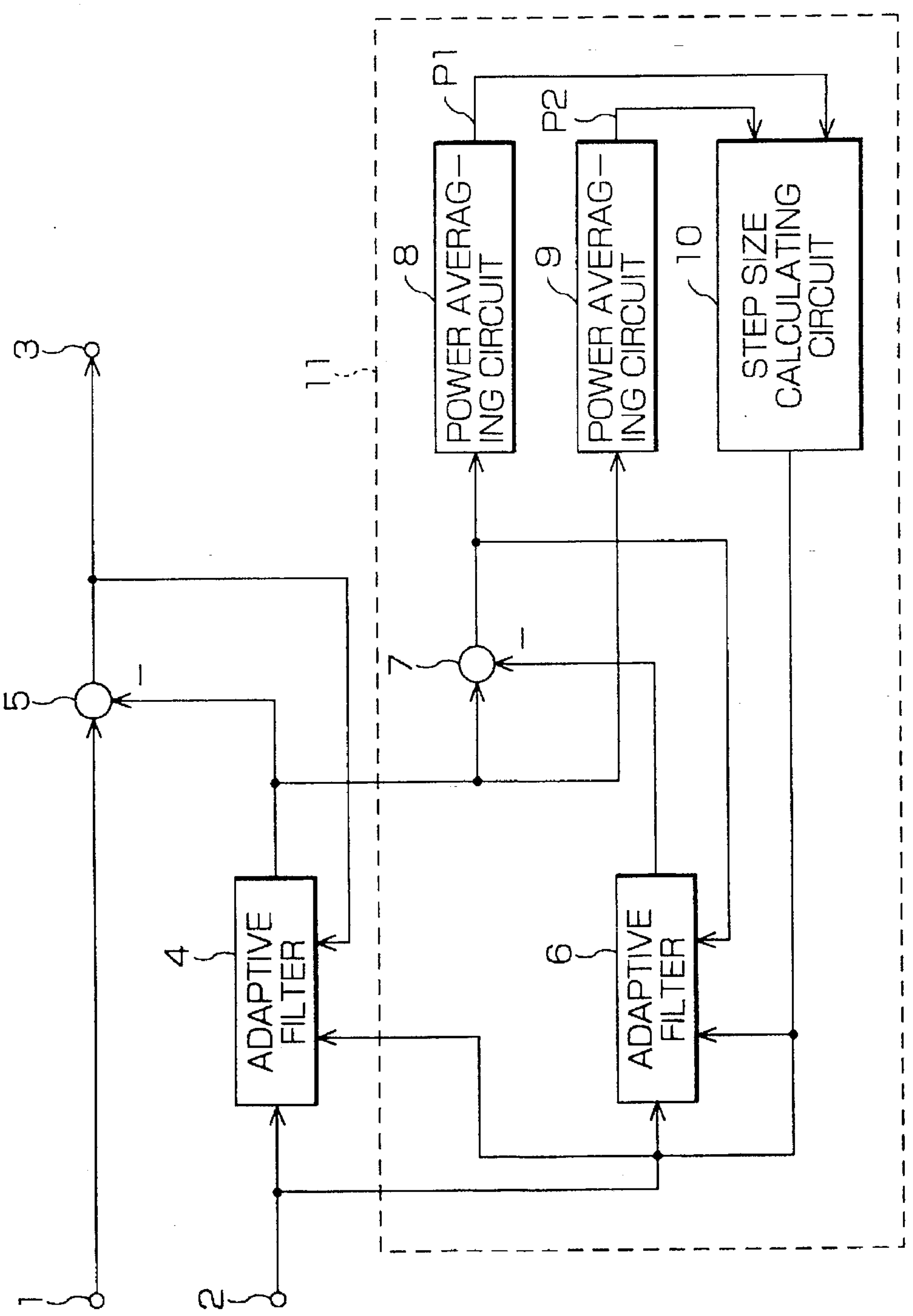
FIG. 2 is a block diagram of a noise cancelling device according to an embodiment of this invention.

Turning to FIG. 2, a noise cancelling device according to a preferred embodiment of this invention is similar to the conventional noise cancelling device of FIG. 1 except that a first adaptive filter 4 is used instead of the first adaptive filter 4' of FIG. 1 and that a convergence judging circuit 11 is newly provided. The first adaptive filter 4 is similar to the first adaptive filter 4' of FIG. 1 except that the first adaptive filter 4 operates in response to an output signal of the convergence judging circuit 11 in the manner which will become clear as the description proceeds.

The convergence Judging circuit 11 includes a second subtractor 7. The subtractor 7 subtracts a second pseudo signal from the first pseudo signal and produces a second subtraction result signal.

A second adaptive filter 6 has a plurality of filter coefficients and filters, in accordance with the filter coefficients of the second adaptive filter 6, the second noise signal into a second filtered signal which is for use as the second pseudo signal.

A first power averaging circuit 8 produces a first power average signal representative of a first average P1 of power of the second subtraction result signal. The illustrated first power averaging circuit 8 produces the first power average signal which represents an average value of a square of the second subtraction result signal as the first average P1 of the power of the second error signal. In this event, the first average P1 is obtained in the first power averaging circuit 8 by, for example, calculating an arithmetic mean value of the latest values, L in number, of the squares of the second subtraction result signal, where L represents an integer greater than one.

A second power averaging circuit 9 produces 8 second power average signal representative of a second average P2 of power of the first pseudo signal. The illustrated second power averaging circuit 9 produces the second power average signal which represents another average value of another square of the firs pseudo signal as the second average P2 of the power of the first pseudo signal. Like the first average P1, the second average P2 is obtained in the second power averaging circuit 9 by, for example, calculating an arithmetic mean value of the latest values, L in number, of the squares of the first pseudo signal.

A step size calculating circuit 10 calculates, from the first and the second power average signals, a step size which is for use in each of the first and the second adaptive filters 4 and 6 in renewing the filter coefficients of each of the first and the second adaptive filters 4 and 6 in order to decide a rate of convergence of each of the first and the second adaptive filters 4 and 6 at a time. The step size calculating circuit 10 produces a step size signal representative of the step size.

More specifically, the step size calculating circuit 10 Calculates the step size having an increased value when a ratio (P2/P1) of the second average P2 to the first average P1 is smaller than a predetermined threshold value. The step size calculating circuit calculates the step size having a decreased value when the ratio (P2/P1) of the second average P2 to the first average P1 is larger than the predetermined threshold value.

The first adaptive filter 4 renews the filter coefficients of the first adaptive filter 4 into renewed filter coefficients of the first adaptive filter 4 in accordance with the second noise signal and the first subtraction result signal supplied as the first error signal and in accordance with the step size signal.

The second adaptive filter 6 renews the filter coefficients of the second adaptive filter 6 into renewed filter coefficients of the second adaptive filter 6 in accordance with the second noise signal and the second subtraction result signal supplied as a second error signal and in accordance with the step size signal.

Operation of the noise cancelling device will now be described.

The second adaptive filter 6 is operable an response to a filter input signal which is same as a filter input signal of the first adaptive filter 4. That is, the second adaptive filter 6 responds to the second noise signal and produces the second pseudo signal. The second subtractor 7 subtracts an output signal (namely, the second pseudo signal) of the second adaptive filter 6 from an output signal (namely, the first pseudo signal) of the first adaptive filter 4 and produces a second difference signal. The second difference signal is supplied to the second adaptive filter 6 as the second error signal. As a result, the second adaptive filter 6 carries out adaptive operation so as to cancel the first pseudo signal (namely, an estimated noise signal) produced by the first adaptive filter 4. The second adaptive falter 6 is not converged until the first adaptive filter 4 is substantially completely converged and stabilized. Accordingly, convergence of the first adaptive filter 4 is detected by convergence of the second adaptive filter 6.

The second error signal of the second adaptive filter 6 does not contain a speech signal component, unlike the first error signal of the first adaptive filter 4. Accordingly, even in a condition where the speech signal is supplied to the noise cancelling device, judgement of the convergence condition is possible by monitoring a decrease in power level of the second error signal.

The step size calculating circuit 10 compares the first and the second averages P1 and P2. When the ratio (P2/P1) is smaller than the predetermined threshold value, judgement is made that the second adaptive filter 6 is being converged. That is, judgement is made that convergence of the second adaptive filter is in progress. In this case, the step size signal indicating the step size of a large value is supplied to the first and the second adaptive filters 4 end 6 to increase a convergence speed or rate. On the other hand, when the ratio (P2/P1) is greater than the predetermined threshold value, judgment is made that the second adaptive filter 6 has completely been converged. That is, judgement is made that convergence of the second adaptive filter comes to an end. In this case, the step size signal indicating the step size of a small value is supplied to the first and the second adaptive filters 4 and 6 to suppress a distortion after convergence.

As a consequence, each of the first and the second adaptive filters 4 and 6 renews the filter coefficients in accordance with the step size signal.

The noise cancelling device including the above-mentioned convergence judging circuit 11 is effective for use in a speech processing device such as a narrow-band speech encoding unit of a high information compression type or a speech recognition unit.

As described above, in the noise cancelling device operable to cancel the noise by subtracting the first pseudo signal of the first adaptive filter from the speech signal with the noise superposed thereon, the second adaptive filter is operated to cancel the first pseudo signal containing no speech signal. Judgement is made of the convergence condition of the first adaptive filter with reference to an average power level of the first pseudo signal and another average power level of the second error signal of the second adaptive filter. Based on the judgement, control is made of the step size for renewing the filter coefficients of the first and the second adaptive filters. Thus, it is possible according to this invention to realize a reduced convergence time and a suppressed distortion in the noise-cancelled signal after convergence.

Figure 3:
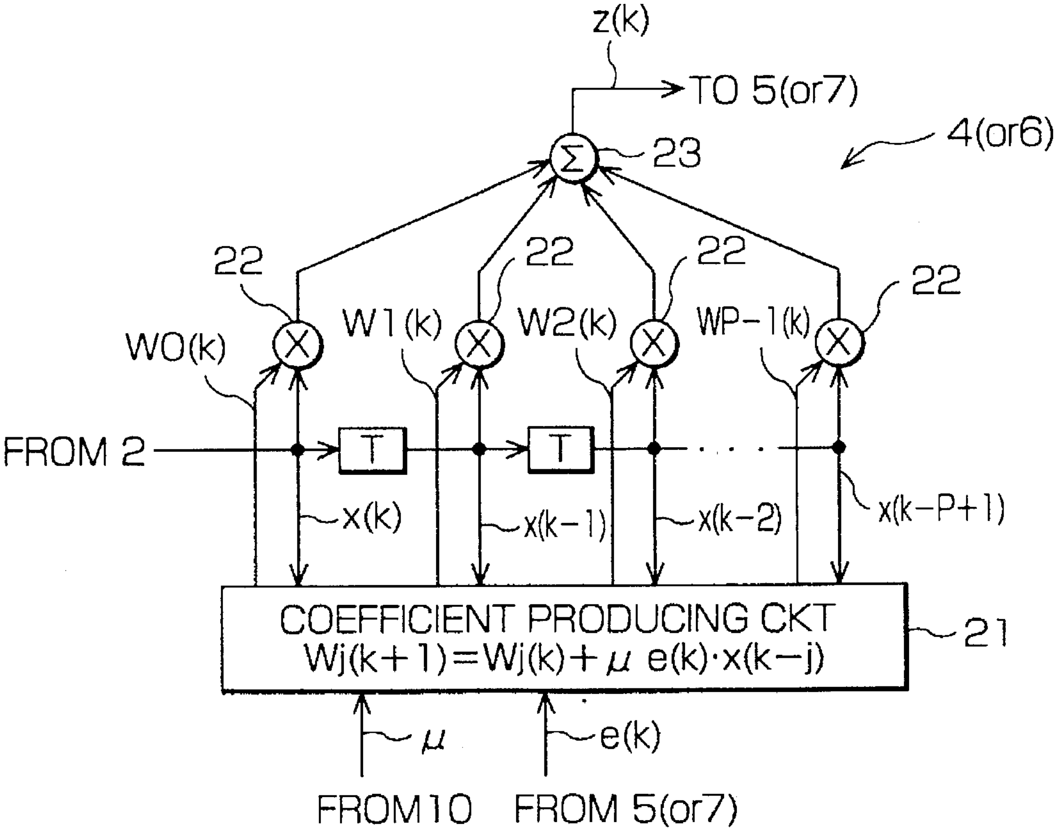
FIG. 3 is a block diagram of an adaptive filter which can be used in the noise cancelling device illustrated an FIG. 2.

Turning to FIG. 3, the first adaptive filter 4 (or the second adaptive filter 6) comprises a tapped delay line which has a predetermined number P of taps and delay elements T. Each of the delay elements T is connected between adjacent two of the taps and has a predetermined delay. The tapped delay line is supplied with the second noise signal as an input signal x(k) of the first adaptive filter 4 (or the second adaptive filter 6), where k is an index indicating a time.

A coefficient producing circuit 21 is connected to the taps of the tapped delay line. The coefficient producing circuit 21 is supplied with signals x(k), x(k−1), x(k−2), . . . , and x(k−P+1) from the taps, the first error signal e(k) from the first subtractor 5 (or the μ second subtractor 7), and the step size μ from the step size calculating circuit 10 and produces a predetermined number P of the filter coefficients on the basis of the LMS algorithm. In this event, the coefficient producing circuit 21 renews a j-th filter coefficient wj(k) at the time instant k into a renewed filter coefficient wj(k+1) in response to the input Signal x(k), the error signal e(k), and the step size μ and in accordance with the above-mentioned Equation (3). The illustrated renewed filter coefficients are w0(k), w1 (k), w2 (k), . . . , and w(P-1) (k).

A predetermined number P of multipliers 22 are connected to the coefficient producing circuit 21 and to the taps.

The multipliers 22 produce product signals (w0(k)·x(k)), (W1(k)·x(k-1)), (w2(k)·x(k-2)), . . . , and (w(P−1)(k)·x(k−P+1)). An adder 23 produces a sum of the product signals as the first pseudo signal (or the second pseudo signal) z(k) of the first adaptive filter 4 (or the second adaptive filter 6). The first pseudo signal (or the second pseudo signal) z(k) is supplied to the first subtractor 5 (or the second subtractor 7).

What is claimed is:

1. A noise cancelling device including: a first input terminal for receiving an input signal comprising a main signal and a first noise signal superposed on said main signal; a second input terminal for receiving a second noise signal which is not correlated with said main signal but is correlated with said first noise signal; an output terminal; a first subtractor for subtracting a first pseudo signal from said input signal to produce a first subtraction result signal which is delivered to said output terminal; and a first adaptive filter having a plurality of filter coefficients for filtering, in accordance with the filter coefficients of said first adaptive filter, said second noise signal into a first filtered signal which is for use as said first pseudo signals wherein said noise cancelling device comprises:

a second subtractor for subtracting a second pseudo signal from said first pseudo signal to produce a second subtraction result signal;

a second adaptive filter having a plurality of filter coefficients for filtering, in accordance with the filter coefficients of said second adaptive filter, said second noise signal into a second filtered signal which is for use as said second pseudo signal;

a first power averaging circuit for producing a first power average signal representative of a first average (P1) of power of said second subtraction result signal;

a second power averaging circuit for producing a second power average signal representative of a second average (P2) of power of said first pseudo signals; and a step size calculating circuit for calculating, from said first and said second power average signals, a step size which is for use in renewal of the filter coefficients of each of said first and said second adaptive filters in deciding a rate of convergence of each of said first and said second adaptive filters at a time, said step size calculating circuit producing a step size signal representative of said step sizes;

said first adaptive filter renewing the filter coefficients of said first adaptive filter into renewed filter coefficients of said first adaptive filter in accordance with said second noise signal and said first subtraction result signal supplied as a first error signal and in accordance with said step size signal;

said second adaptive filter renewing the filter coefficients of said second adaptive filter into renewed filter coefficients of said second adaptive filter in accordance with said second noise signal and said second subtraction result signal supplied as a second error signal and in accordance with said step size signal.

2. A noise cancelling device as claimed in claim 1, wherein:

said step size calculating circuit calculates said step size having an increased value when a ratio (P2/P1) Of said second average (P2) to said first average (P1) is smaller than a predetermined threshold value, said step size calculating circuit calculating said step size having a decreased value when said ratio (P2/P1) of the second average (P2) to the first average (P1) is larger than said predetermined threshold value.

3. A noise cancelling device as claimed in claim 1, wherein said first power averaging circuit produces said first power average signal which represents an average value of a square of said second subtraction result signal as said first average (P1) of the power of said second error signal;

said second power averaging circuit producing said second power average signal which represents another average value of another square of said first pseudo signal as said second average (P2) of the power of said first pseudo signal.

4. A noise cancelling device as claimed in claim 3, wherein:

said step size calculating circuit calculates said step size having an increased value when a ratio (P2/P1) of said second average (P2) to said first average (P1) is smaller than a predetermined threshold value, said step size calculating circuit calculating said step size having a decreased value when said ratio (P2/P1) of the second average (P2) to the first average (P1) larger than said predetermined threshold value.

* * * * *